United States Patent
Macy et al.

(10) Patent No.: US 10,565,197 B2
(45) Date of Patent: Feb. 18, 2020

(54) SEARCH PERFORMANCE USING SMART BITMAP OPERATIONS

(71) Applicant: International Business Machines Corporation, Armonk, NY (US)

(72) Inventors: Brian E. Macy, Henderson, NV (US); Bin Qin, Herndon, VA (US); Stephen J. Watjen, Ashburn, VA (US); Frank E. Whaley, Roanoke, VA (US); Charles K. Williams, Oak Hill, VA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 15/447,858

(22) Filed: Mar. 2, 2017

(65) Prior Publication Data
US 2018/0253472 A1    Sep. 6, 2018

(51) Int. Cl.
*G06F 16/00* (2019.01)
*G06F 16/2453* (2019.01)
*G06F 16/2455* (2019.01)

(52) U.S. Cl.
CPC .... *G06F 16/24535* (2019.01); *G06F 16/2455* (2019.01)

(58) Field of Classification Search
CPC ............... G06F 16/334; G06F 16/2453; G06F 16/2455; G06F 16/284
See application file for complete search history.

(56) References Cited

U.S. PATENT DOCUMENTS

| | | | |
|---|---|---|---|
| 9,020,911 B2 | 4/2015 | Biesenbach et al. | |
| 9,576,060 B2 | 2/2017 | Singh et al. | |
| 2006/0026138 A1 | 2/2006 | Robertson et al. | |
| 2011/0270871 A1 | 11/2011 | He et al. | |
| 2013/0185327 A1* | 7/2013 | Biesenbach | G06F 16/334 707/769 |
| 2014/0279757 A1 | 9/2014 | Shimanovsky et al. | |
| 2015/0261862 A1 | 9/2015 | Mittal et al. | |

FOREIGN PATENT DOCUMENTS

WO    2016174171 A1    11/2016

OTHER PUBLICATIONS

Grace Period Disclosure, Anonymous, "IBM InfoSphere Global Name Management V6.0 delivers latest name search technology and enhanced personal name analysis and searching", IBM United States Software Announcement 216-481, Dec. 6, 2016.

* cited by examiner

*Primary Examiner* — Merilyn P Nguyen
(74) *Attorney, Agent, or Firm* — North Shore Patents, P.C.; Joseph L. Acayan

(57) ABSTRACT

A system creates a query name bitmap signature comprising at least one bigram for a query name. The system calculates a query name bitmap range for the query name based on a match threshold and a number of bigrams in the query name bitmap signature. The system creates a data list name bitmap signature comprising at least one bigram, for each of a plurality of data list names, and identifies a subset of the plurality of data list names. The subset comprises data list name bitmap signatures that are within the query name bitmap range. The system reduces a number of comparisons by comparing only the query name and each of the subset of the plurality of data list names when performing the analytical name search. The system also reduces the number of comparisons by reducing the number of bit positions that are compared.

21 Claims, 3 Drawing Sheets

SEARCH PERFORMANCE USING SMART BITMAP OPERATIONS

The following disclosure is submitted under 35 U.S.C. 102(b)(1)(A):
DISCLOSURE: "IBM InfoSphere Global:Name Management V6.0 delivers latest name search technology and enhanced personal name analysis and searching", Anonymous, IBM United States Software Announcement 216-481, Dec. 6, 2016.

BACKGROUND

Analytical name search engines compare a query name to every name in the data list to be searched. This method of comparing names is slower, yet more accurate than other methods. Therefore, it would be helpful to increase the performance of the analytical name search engine without sacrificing the accuracy of the name search results.

SUMMARY

According to an embodiment of the present invention, in a method for improving performance within an analytical name search, the method creates a query name bitmap signature comprising at least one bigram for a query name. The method calculates a query name bitmap range for the query name based on a match threshold and a number of bigrams in the query name bitmap signature. The method creates a data list name bitmap signature comprising at least one bigram, for each of a plurality of data list names, and identifies a subset of the plurality of data list names. The subset comprises data list name bitmap signatures that are within the query name bitmap range. The method reduces a number of comparisons between the query name and the plurality of data list names by comparing only the query name and each of the subset of the plurality of data list names when performing the analytical name search. The method reduces a number of bit positions that are compared between the query name bitmap signature and each of the data list name bitmap signatures in the subset of the plurality of data list names. The method identifies at least one bit position pattern associated with the query name bitmap signature to eliminate data list name bitmap signatures from the subset of the plurality of data list names that do not match at least one bit position pattern. The method reduces the number of comparisons by reducing a number of bit positions that are compared between the query name bitmap signature and each of the data list name bitmap signatures in the subset of the plurality of data list names by optimally arranging bit positions within the query name bitmap signature and each of the data list name bitmap signatures.

In an example embodiment, when the method calculates the query name bitmap range, the method assigns at least one bigram to a bit position in the query name bitmap signature. The method determines a number of bigrams in a comparison name bitmap signature, and determines a number of matching bit positions between the query name bitmap signature and the comparison name bitmap signature. The method determines a minimum number of matching bit positions between the query name bitmap signature and the comparison name bitmap signature. The method determines a maximum number of matching bit positions between the query name bitmap signature and the comparison name bitmap signature. The method calculates the query name bitmap range for the query name bitmap signature based on the match threshold, the number of bigrams in the query name bitmap signature, the number of bigrams in the comparison name bitmap signature, and the number of matching bit positions between the query name bitmap signature and the comparison name bitmap signature.

In an example embodiment, when the method identifies the subset of the plurality of data list names, the method groups the data list name bitmap signatures based on a number of matching bit positions between each of the data list name bitmap signatures and the query name bitmap signature. The method identifies data list name bitmap signatures that are within the query name bitmap range, where the query name bitmap range comprises a minimum number of matching bit positions and a maximum number of matching bit positions.

System and computer program products corresponding to the above-summarized methods are also described and claimed herein.

DETAILED DESCRIPTION

Figure 1:
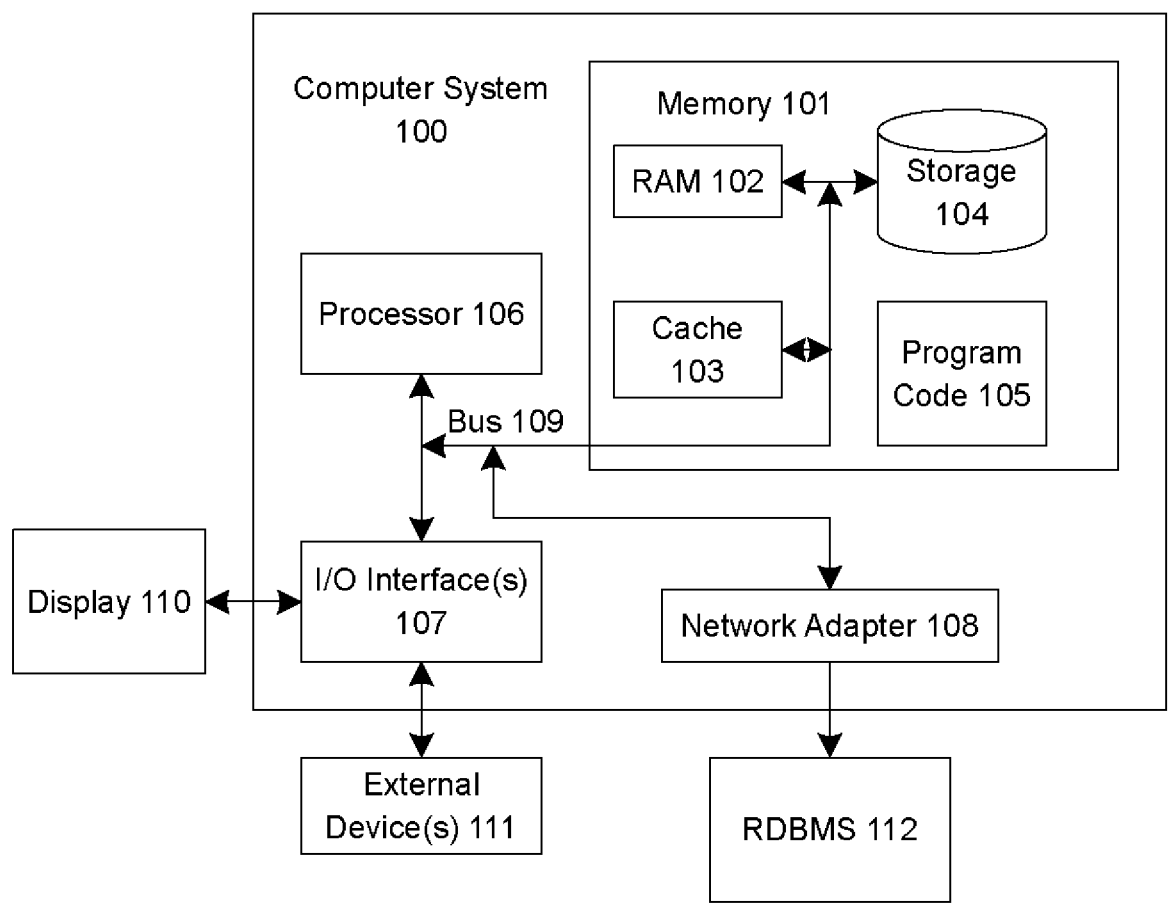
FIG. 1 illustrates an embodiment of a system for improving performance within an analytical name search, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for improving performance within an analytical name search according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiments of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
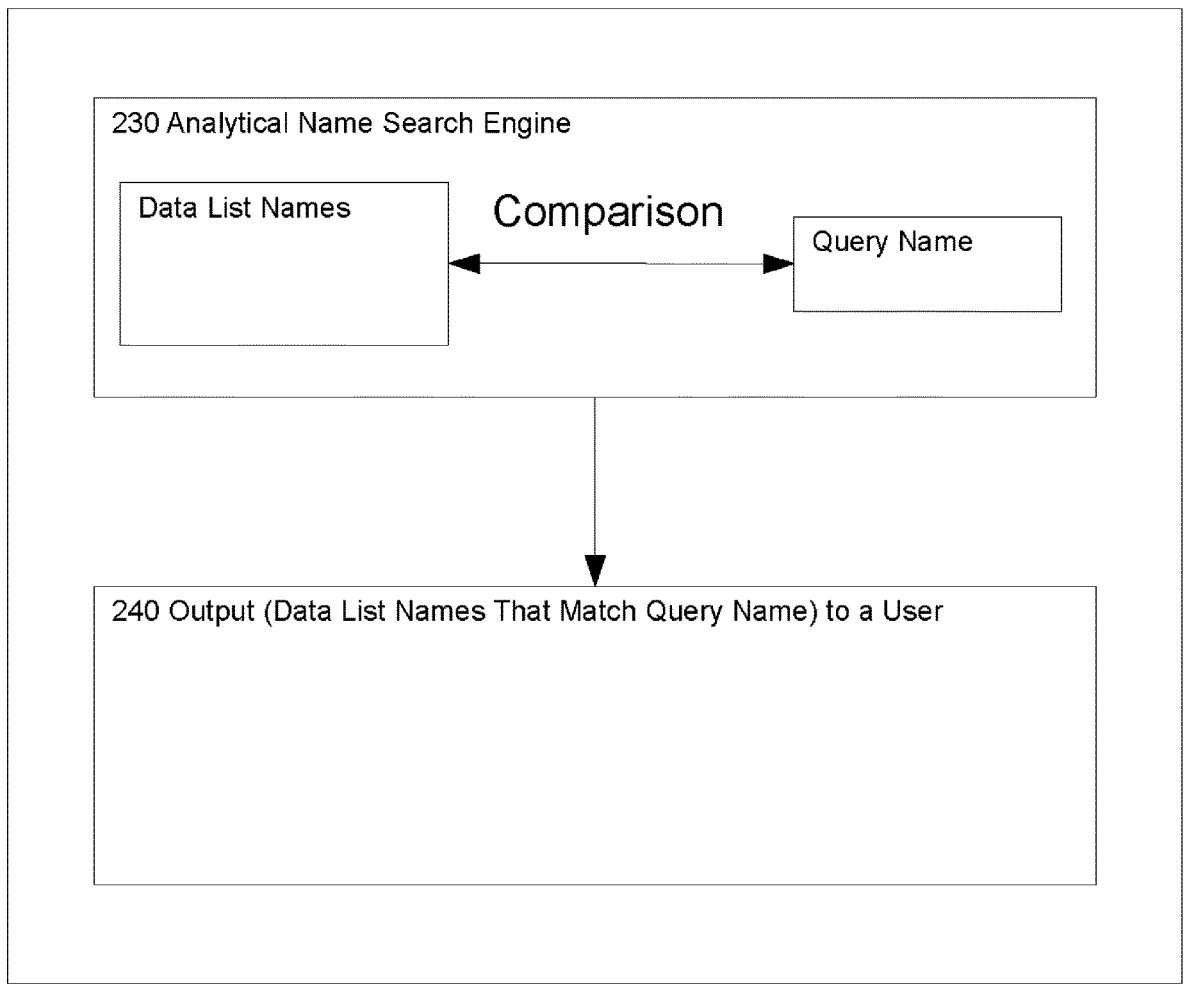
FIG. 2 illustrates an example analytical name search engine, according to embodiments disclosed herein.

FIG. 2 illustrates an example analytical name search engine 230, according to embodiments disclosed herein. The analytical name search engine 230 compares the query name to the data list names. The analytical name search engine 230 reports any matching data list names to a user as the output 240 of the analytical name search.

Figure 3:
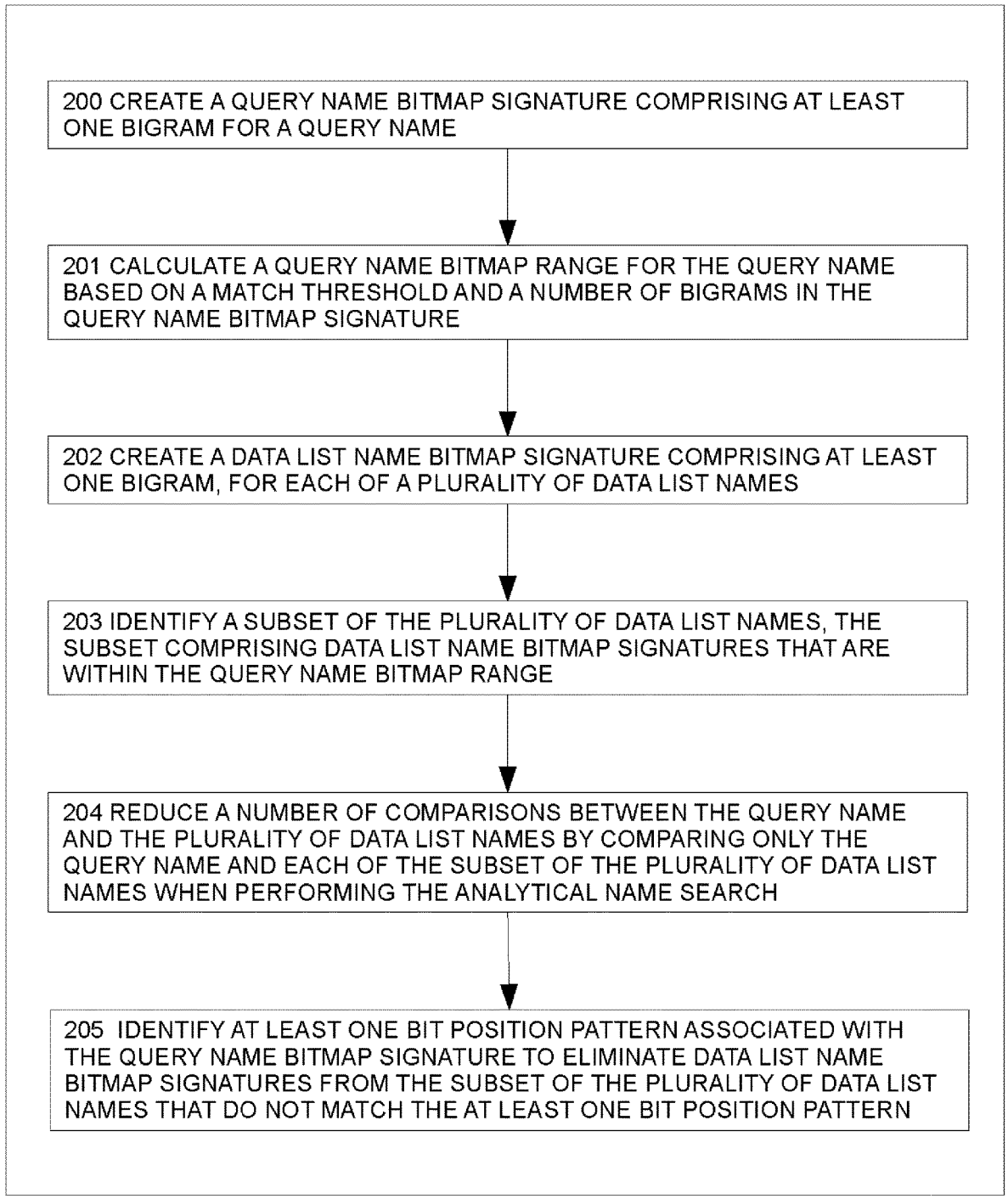
FIG. 3 is a flowchart illustrating an embodiment of a method for improving performance within an analytical name search, according to embodiments disclosed herein.

FIG. 3 illustrates an embodiment of a method for improving performance within an analytical name search. In an analytical name search using a name search engine, a query name is compared to each name in a data list of names, and a similarity score is generated. Data list names whose similarity scores are greater than a user-defined match threshold are then returned to the user. Performing a search on data list names that run in the tens of millions can place considerable pressure on analytical engines to meet performance requirements.

At 200, the method, via the processor 106, creates a query name bitmap signature, comprising at least one bigram, for a query name. A bigram is a sequence of two adjacent elements from a string. For example, the query name "JOHN" results in five bigrams as shown below.

Query name: _J JP OH HN N_

In this example embodiment, a bigram is used, but a n-gram may also be used. A bigram is an n-gram where n=2. A bitmap may be designed so that each bit in the bitmap represents a character n-gram. A character n-gram may be described as a group of n adjacent characters. For example, _J, JO, OH, HN, and N_ may each be a character n-gram where n=2. Character n-grams of n-letters turn on individual bits in the bitmap to form the bitmap signature. A bit in the bitmap that is turned on may also be referred to as an activated bit position.

At 201, the method calculates a query name bitmap range for the query name based on a match threshold and a number of bigrams in the query name bitmap signature. In an example embodiment, the match threshold may be a user defined similarity threshold. For example, if the match threshold is 50%, and the number of bigrams in the query name is 10, then the query name bitmap range for the query name may be between 4, and 30, meaning the number of matching bigrams (or activated bit positions) of a data list name would have to be between 4 and 30 to be considered a potential match for the query name. Various calculations may be used to determine the query name bitmap range.

At 202, the method creates a data list name bitmap signature comprising at least one bigram, for each of a plurality of data list names. As noted above, in an analytical name search, the query name is compared to each name within the plurality of data list names. In this example embodiment, the method creates a data list name bitmap signature for each of the data list names in the plurality of the data list names for comparison with the query name bitmap signature. In this example embodiment, each of the data list name bitmap signatures comprises at least one bigram. In another example embodiments, the data list name bitmap signatures may comprise at least one n-gram.

At 203, the method identifies a subset of the plurality of data list names where the data list name bitmap signatures are within the query name bitmap range. For example, listed below are the bigrams contained in the names "JOHN" and "JOHNSON". In this example embodiment, "JOHN" is the query name, and "JOHNSON" is a data list name that is compared to the query name to determine a match. The matching bigrams are shown in bolded font:

Query name: _J JO OH HN N_
Data list name: _J JO OH HN NS SO ON N_

The names "JOHN" and "JOHNSON" have five matching bigrams. Assuming five matching bigrams is within the query name bitmap range for the query name "JOHN", then the method identifies the data list name "JOHNSON" as a data list name within the subset of the plurality of data list names. If five matching bigrams is not within the query name bitmap range for the query name "JOHN", then the method eliminates the data list name "JOHNSON" from the subset of the plurality of data list names.

At 204, the method reduces a number of comparisons between the query name and the plurality of data list names by comparing only the query name and each of the subset of the plurality of data list names when performing the analytical name search. As noted above, in an analytical name search, the search engine compares the query name with each of the names in a plurality of data list names, resulting in many comparisons and impacting the performance of the search engine. According to embodiments disclosed herein, the method increases the performance of the search engine while maintaining the accuracy of the analytical name search by reducing the number of comparisons that are performed between the query name and the plurality of data list names by only comparing the query name with the subset of the plurality of data list names. The subset of the plurality of data list names is selected by comparing the data list name bitmap signatures with a query name bitmap range, and eliminating those data list names (from the subset of the plurality of data list names) whose bitmap signatures fall outside the query name bitmap range. More specifically, the method eliminates those data list names whose activated bits (within their respective bitmap signatures) fall outside the query name bitmap range. The method compares the query name bitmap signature to each of the data list name bitmap signatures in the subset of the plurality of data list names. The result of the analytical search is the data list names that match the query name. This result is reported out, by the analytical name search engine 230, to a user.

At 205, the method identifies at least one bit position pattern associated with the query name bitmap signature to eliminate data list name bitmap signatures from the subset of the plurality of data list names that do not match at least one bit position pattern. In an example embodiment, the method identifies a bit position pattern associated with the query name bitmap signature, and compares the query name bit position pattern to bit position patterns in the respective bitmap signatures of the subset of the plurality of data list names to further reduce the number of comparisons. Those data list name bitmap signatures that do not match the query name bit position pattern are eliminated from the subset of the plurality of data list names. For example, a data list name bitmap signature that has an activated bit in the first bitmap position could not be a match for a query name bitmap signature that has activated bits in the $7^{th}$, $8^{th}$, and $9^{th}$ bitmap position. In this example, the data list name would be eliminated prior to performing the analytical search. In another example embodiment, the decimal values of the query name bitmap signature, and the data list name bitmap signatures are determined (based on the bit position of the 1s and 0s within the bitmap signatures, where each activated $n^{th}$ bit position is calculated as $2^{n-1}$). Based on the decimal value of the query name bitmap signature, the method determines bitmap positions of the data list name bitmap signatures that, if turned on (i.e., activated, or having a value of "1"), indicate that those particular data list names could not possibly be a match (i.e., the decimal value of the data list name bitmap signatures for those data list names would either be too high or too low to be a possible match for the query name). In this example embodiment, the identified query name pattern is determined by a decimal value of the query name bitmap signature. In another example embodiment, the data list names are sorted according to the decimal value of the respective data list name bitmap signatures, and data list names are eliminated if the decimal values of the respective data list name bitmap signature are outside of the determined decimal range of the query name bitmap signature. Those data list names are also eliminated from the analytical name search. This further reduction of data list names further increases the performance of the search engine while maintaining the accuracy of the analytical name search.

In an example embodiment, the method reduces a number of bit positions that are compared between the query name bitmap signature and each of the data list name bitmap signatures in the subset of the plurality of data list names.

For example, a query name bitmap signature has 10 bigrams, the match threshold is 50%, and the query name threshold range is between 4 and 30 matching bigrams. Therefore, an example data list name bitmap signature would need to have between 4 and 30 matching bigrams (or activated bit positions) for that example data list name to be included in the subset of the plurality of data list names that are compared with the query name during the analytical name search. If the query name bitmap signature were to have twelve zeros in the right-most positions, for an example data name to be a potential match, the example data list name bitmap signature must have at least four activated bits in the leftmost 52 positions (assuming a standard 64-bit signature). Any potentially matching data list name bitmap signature must therefore be greater than or equal to:

1111 0000 0000 0000

The remaining zeros on the left are not represented. In another example embodiment, a query name bitmap signature has 12 bigrams, and any potentially matching data list name bitmap signatures must have a least six activated bits. Therefore, a potential matching data list name bitmap signature must be greater than or equal to:

11 1111 0000 0000 0000

This establishes a lower bound limit. The same logic applies to establish an upper bound limit. Given a match threshold and a query name bitmap signature, the number of zeros on the right side of the query name bitmap signature will determine the lower bound, and the number of zeros on the left side of the query name bitmap signature will determine the upper bound. Within the subset of name list bitmap signatures that are within the query name threshold range, only the data list names whose bitmap signatures fall within the established lower and upper bounds will be compared with the query name during the analytical name search. This not only reduces the number of bit positions that are compared, but also reduces the number of data list names that are compared with the query name.

In an example embodiment, the method reduces the number of comparisons by reducing a number of bit positions that are compared between the query name bitmap signature and each of the data list name bitmap signatures in the subset of the plurality of data list names by optimally arranging bit positions within the query name bitmap signature and each of the data list name bitmap signatures. For example, the bitmap signatures in the query name and each of the data list name bitmap signature may be sorted according to the decimal value 1s and 0s (i.e., activated bit positions and not activated bit positions within the bitmap signature). The method then performs searching only on those data list names whose bitmap signatures could potentially be a match based on the activated bit positions.

In an example embodiment, when the method calculates the query name bitmap range, the method assigns at least one bigram to a bit position in the query name bitmap signature. For example, the method divides the query name "JOHN" into bigrams (such as _J, JO, OH, HN, and N_). Each position of a 64 bitmap is assigned at least one bigram, such as AA, CK, JO, EU, HD, HN, JN, LX, OG, QQ, VJ, XT, etc. If the bigrams in the query name match a bigram in the 64 bitmap, that bit position is turned on, or activated, within the query name bitmap signature. The method also determines the number of bigrams in a comparison name bitmap signature (where the comparison name will be compared to the query name during the analytical name search to determine a match). The method determines the number of matching bit positions between the query name bitmap signature and the comparison name bitmap signature. In an example embodiment, the method determines a minimum number of matching bit positions between the query name bitmap signature and the comparison name bitmap signature. The method also determines a maximum number of matching bit positions between the query name bitmap signature and the comparison name bitmap signature. The method calculates the query name bitmap range for the query name bitmap signature based on the match threshold, the number of bigrams in the query name bitmap signature, the number of bigrams in the comparison name bitmap signature, and the number of matching bit positions between the query name bitmap signature and the comparison name bitmap signature. For example, "T" represents the match threshold, "Q" represents the number of bigrams in the query name, and "D" represents the number of bigrams in the data list name. In an example embodiment, the potential match between query name and the data list name may be calculated using:

$$2*M \geq T*(Q+D)$$

Using the example of "JOHN" as the query name and "JOHNSON" as the data list name:

Query name: _J JO OH HN N_

Data list name: _J JO OH HN NS SO ON N_

The five matching bigrams are "_J", "JO", "OH", "HN", and "N_". Using the above formula, Q=5, D=8, and M=5 (i.e., there are 5 matching bigrams between the two names). Using a 50% match threshold, the query name and the comparison name would be considered potential matches:

$$2*(5) \geq 0.5*(5+8) \ 10 \geq 6.5 \ \text{True, match}$$

Using an 80% match threshold, the query name and the comparison name do not match:

$$2*(5) \geq 0.8*(5+8) \ 10 \geq 10.4 \ \text{False, no match}$$

Other formulas may also be used to determine whether the query name and comparison names are potential matches.

In an example embodiment, when the method identifies the subset of the plurality of data list names, the method groups the data list name bitmap signatures based on a number of matching bit positions between each of the data list name bitmap signatures and the query name bitmap signature. For example, the method may group data list name bitmap signatures that have three matching bit positions with the query name in one group, data list name bitmap signatures that have four matching bit positions with the query name in a second group, data list name bitmap signatures that have five matching bit positions with the query name in yet another group, etc. Based on a calculated query name bitmap range (i.e., a minimum and maximum number of matching bitmap positions between the query name and a data list name), the method identifies data list names that are within the query name bitmap range based on these data list name bitmap signature groupings. The identified data list names are included in the subset of the plurality of data list names that are compared to the query name to reduce the number of overall comparisons. In another example embodiment, after grouping the data list name bitmap signatures based on the number of matching bit positions between each of the data list name bitmap signatures and the query name bitmap signature, the method eliminates those data list name bitmap signatures that do not fall within the established lower and upper bound (as explained above). Only the data list names whose bitmap signatures fall within the established lower and upper bounds will be compared with the query name during the analytical name search.

Embodiments disclosed herein detail various techniques to reduce the number of comparisons between a query name and a plurality of data list names. Any of the techniques recited above may be used in any combination to reduce the number of comparisons while still maintaining the accuracy of the analytical search engine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of improving performance within an analytical name search, the method comprising:
    creating a query name bitmap signature comprising at least one bigram for a query name;
    calculating a query name bitmap range for the query name based on a match threshold and a number of bigrams in the query name bitmap signature;
    creating a data list name bitmap signature comprising at least one bigram, for each of a plurality of data list names;
    identifying a subset of the plurality of data list names, the subset comprising data list name bitmap signatures that are within the query name bitmap range; and
    reducing a number of comparisons between the query name and the plurality of data list names by:
        eliminating data list names from the subset of the plurality of data list names that have at least one bit position pattern that does not match a predetermined bit position pattern associated with the query name; and
        comparing only the query name and each of the subset of the plurality of data list names when performing the analytical name search.

2. The method of claim 1 further comprising:
    reducing a number of bit positions that are compared between the query name bitmap signature and each of the data list name bitmap signatures in the subset of the plurality of data list names.

3. The method of claim 1 further comprising:
    identifying at least one bit position pattern associated with the query name bitmap signature to eliminate data list name bitmap signatures from the subset of the plurality of data list names that do not match the at least one bit position pattern.

4. The method of claim 1 further comprising:
    reducing the number of comparisons by reducing a number of bit positions that are compared between the query name bitmap signature and each of the data list name bitmap signatures in the subset of the plurality of data list names by optimally arranging bit positions within the query name bitmap signature and each of the data list name bitmap signatures.

5. The method of claim 1 wherein calculating the query name bitmap range comprises:
    assigning the at least one bigram to a bit position in the query name bitmap signature;
    determining a number of bigrams in a comparison name bitmap signature; and
    determining a number of matching bit positions between the query name bitmap signature and the comparison name bitmap signature.

6. The method of claim 5 further comprising:
    determining a minimum number of matching bit positions between the query name bitmap signature and the comparison name bitmap signature; and
    determining a maximum number of matching bit positions between the query name bitmap signature and the comparison name bitmap signature.

7. The method of claim 5 further comprising:
    calculating the query name bitmap range for the query name bitmap signature based on the match threshold, the number of bigrams in the query name bitmap signature, the number of bigrams in the comparison name bitmap signature, and the number of matching bit positions between the query name bitmap signature and the comparison name bitmap signature.

8. The method of claim 1 wherein identifying the subset of the plurality of data list names comprises:
    grouping the data list name bitmap signatures based on a number of matching bit positions between each of the data list name bitmap signatures and the query name bitmap signature; and
    identifying data list name bitmap signatures that are within the query name bitmap range, the query name bitmap range comprising a minimum number of matching bit positions and a maximum number of matching bit positions.

9. A computer program product for improving performance within an analytical name search, the computer program product comprising:
    a computer readable storage medium having computer readable program code embodied therewith, the program code executable by a computer processor to:
    create a query name bitmap signature comprising at least one bigram for a query name;
    calculate a query name bitmap range for the query name based on a match threshold and a number of bigrams in the query name bitmap signature;
    create a data list name bitmap signature comprising at least one bigram, for each of a plurality of data list names;
    identify a subset of the plurality of data list names, the subset comprising data list name bitmap signatures that are within the query name bitmap range; and
    reduce a number of comparisons between the query name and the plurality of data list names by:
        eliminating data list names from the subset of the plurality of data list names that have at least one bit position pattern that does not match a predetermined bit position pattern associated with the query name; and
        comparing only the query name and each of the subset of the plurality of data list names when performing the analytical name search.

10. The computer program product of claim 9 further configured to:
    reduce a number of bit positions that are compared between the query name bitmap signature and each of the data list name bitmap signatures in the subset of the plurality of data list names.

11. The computer program product of claim 9 further configured to:
    identify at least one bit position pattern associated with the query name bitmap signature to eliminate data list name bitmap signatures from the subset of the plurality of data list names that do not match the at least one bit position pattern.

12. The computer program product of claim 9 further configured to:
    reduce the number of comparisons by reducing a number of bit positions that are compared between the query name bitmap signature and each of the data list name bitmap signatures in the subset of the plurality of data list names by optimally arranging bit positions within the query name bitmap signature and each of the data list name bitmap signatures.

13. The computer program product of claim 9 wherein the computer readable program code configured to calculate the query name bitmap range is further configured to:
assign the at least one bigram to a bit position in the query name bitmap signature; determining a number of bigrams in a comparison name bitmap signature; and
determine a number of matching bit positions between the query name bitmap signature and the comparison name bitmap signature.

14. The computer program product of claim 13 further configured to:
calculate the query name bitmap range for the query name bitmap signature based on the match threshold, the number of bigrams in the query name bitmap signature, the number of bigrams in the comparison name bitmap signature, and the number of matching bit positions between the query name bitmap signature and the comparison name bitmap signature.

15. A system comprising:
a computing processor; and
a computer readable storage medium operationally coupled to the processor, the computer readable storage medium having computer readable program code embodied therewith to be executed by the computing processor, the computer readable program code configured to:
create a query name bitmap signature comprising at least one bigram for a query name;
calculate a query name bitmap range for the query name based on a match threshold and a number of bigrams in the query name bitmap signature;
create a data list name bitmap signature comprising at least one bigram, for each of a plurality of data list names;
identify a subset of the plurality of data list names, the subset comprising data list name bitmap signatures that are within the query name bitmap range; and
reduce a number of comparisons between the query name and the plurality of data list names by:
eliminating data list names from the subset of the plurality of data list names that have at least one bit position pattern that does not match a predetermined bit position pattern associated with the query name; and
comparing only the query name and each of the subset of the plurality of data list names when performing the analytical name search.

16. The system of claim 15 further configured to:
reduce a number of bit positions that are compared between the query name bitmap signature and each of the data list name bitmap signatures in the subset of the plurality of data list names.

17. The system of claim 15 further configured to:
identify at least one bit position pattern associated with the query name bitmap signature to eliminate data list name bitmap signatures from the subset of the plurality of data list names that do not match the at least one bit position pattern.

18. The system of claim 15 further configured to:
reduce the number of comparisons by reducing a number of bit positions that are compared between the query name bitmap signature and each of the data list name bitmap signatures in the subset of the plurality of data list names by optimally arranging bit positions within the query name bitmap signature and each of the data list name bitmap signatures.

19. The system of claim 15 wherein the computer readable program code configured to calculate the query name bitmap range is further configured to:
assign the at least one bigram to a bit position in the query name bitmap signature; determining a number of bigrams in a comparison name bitmap signature; and
determine a number of matching bit positions between the query name bitmap signature and the comparison name bitmap signature.

20. The system of claim 19 further configured to:
determine a minimum number of matching bit positions between the query name bitmap signature and the comparison name bitmap signature;
determine a maximum number of matching bit positions between the query name bitmap signature and the comparison name bitmap signature; and
calculate the query name bitmap range for the query name bitmap signature based on the match threshold, the number of bigrams in the query name bitmap signature, the number of bigrams in the comparison name bitmap signature, and the number of matching bit positions between the query name bitmap signature and the comparison name bitmap signature.

21. A method of improving performance within an analytical name search, the method comprising:
creating a query name bitmap signature comprising at least one bigram for a query name;
calculating a query name bitmap range for the query name based on a match threshold and a number of bigrams in the query name bitmap signature;
creating a data list name bitmap signature comprising at least one bigram, for each of a plurality of data list names;
identifying a subset of the plurality of data list names, the subset comprising data list name bitmap signatures that are within the query name bitmap range, wherein identifying the subset of the plurality of data list names comprises:
grouping the data list name bitmap signatures based on a number of matching bit positions between each of the data list name bitmap signatures and the query name bitmap signature; and
identifying data list name bitmap signatures that are within the query name bitmap range, the query name bitmap range comprising a minimum number of matching bit positions and a maximum number of matching bit positions; and
reducing a number of comparisons between the query name and the plurality of data list names by comparing only the query name and each of the subset of the plurality of data list names when performing the analytical name search.

* * * * *